United States Patent
Nigrin

(10) Patent No.: US 6,561,060 B2
(45) Date of Patent: May 13, 2003

(54) VEHICLE STEERING WHEEL ATTACHMENT

(75) Inventor: Anke Nigrin, Ilmenau (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/881,435

(22) Filed: Jun. 14, 2001

(65) Prior Publication Data

US 2001/0052270 A1 Dec. 20, 2001

(30) Foreign Application Priority Data

Jun. 14, 2000 (DE) .......................... 200 10 360
Oct. 11, 2000 (DE) .......................... 200 17 450

(51) Int. Cl.$^7$ ................................................ B62D 1/10
(52) U.S. Cl. ........................................ 74/552; 403/259
(58) Field of Search .......................... 74/552, 492, 493

(56) References Cited

U.S. PATENT DOCUMENTS

| | | | | |
|---|---|---|---|---|
| 4,095,482 A | * | 6/1978 | Kirschner | 74/422 |
| 4,374,310 A | * | 2/1983 | Kato et al. | 200/61.54 |
| 4,667,529 A | * | 5/1987 | Ono et al. | 403/345 |
| 4,771,650 A | * | 9/1988 | Kerner | 280/731 |
| 4,971,351 A | * | 11/1990 | Flick | 280/613 |
| 5,431,438 A | * | 7/1995 | Manabe | 280/731 |
| 5,588,337 A | * | 12/1996 | Milton | 403/320 |
| 5,816,113 A | * | 10/1998 | Fohl | 403/259 |
| 5,832,787 A | * | 11/1998 | Heilig | 403/259 |
| 5,855,449 A | * | 1/1999 | Thomas | 403/262 |
| 6,033,145 A | | 3/2000 | Xu et al. | 403/256 |
| 6,079,736 A | * | 6/2000 | Koide | 280/728.2 |
| 6,119,546 A | * | 9/2000 | Steffens, Jr. | 280/287 |

FOREIGN PATENT DOCUMENTS

| | | |
|---|---|---|
| CH | 610990 A5 * | 5/1979 |
| DE | 29518638 | 2/1996 |
| DE | 4497497 | 1/1997 |
| DE | 19729688 | 1/1999 |
| DE | 20005884 | 9/2000 |
| FR | 2689584 | 10/1993 |
| JP | 095113 | 4/2000 |

OTHER PUBLICATIONS

U.S. Ser. No. 09/785,725, filed Feb. 16, 2001.

* cited by examiner

Primary Examiner—David A. Bucci
Assistant Examiner—Julie K. Smith
(74) Attorney, Agent, or Firm—Tarolli, Sundheim, Covell & Tummino L.L.P.

(57) ABSTRACT

The invention relates to a vehicle steering wheel attachment for detachably arresting a vehicle steering wheel on a vehicle steering shaft. The steering wheel attachment comprises a free end of a steering shaft which has a multiple-cornered profile, the free end further having a radial groove including a wedge surface. The attachment further comprises a hub portion on the side of the steering wheel, the hub portion including a recess corresponding to the multiple-cornered profile of the steering shaft and a radial guiding surface. A wedge is provided which can be moved along the radial guiding surface so as to be moved in and out of engagement with the groove. A drive screw is provided which is seated in a threaded bore in the hub portion and is rotatably coupled with the wedge.

14 Claims, 2 Drawing Sheets

VEHICLE STEERING WHEEL ATTACHMENT

TECHNICAL FIELD

This invention relates to a vehicle steering wheel attachment, by means of which the vehicle steering wheel is detachably arrested on a steering shaft.

BACKGROUND OF THE INVENTION

In steering wheels which nowadays are usually equipped with gas bag modules, the steering wheel should detachably be arrested at the steering shaft, as steering wheels are completely exchanged after an accident. Due to the presence of the gas bag module it has become much more difficult to accommodate the attachment, as the accessibility from above is no longer existing.

BRIEF SUMMARY OF THE INVENTION

The invention provides a vehicle steering wheel attachment which is distinguished by a simple structure and an extremely stable fixing. The vehicle steering wheel attachment which is proposed comprises a free end of a steering shaft which end has a multiple-cornered profile, i.e. a polygonal cross-section, the free end further having a radial groove including a wedge surface. The attachment further comprises a hub portion of the steering wheel, the hub portion including a multiple-cornered recess corresponding to the profile of the steering shaft and a radial guiding surface. A wedge is provided which can be moved along the radial guiding surface so as to be moved in and out of engagement with the groove. A drive screw is provided which is seated in a threaded bore in the hub portion and is rotatably coupled with the wedge. In the steering wheel attachment proposed, torque transmission is achieved via a multiple-cornered profile which can easily be produced. Axial fixing is effected by means of the wedge, which rests against the wedge surface and leads to an axial clamping of the hub portion on the steering shaft. By means of such axial clamping, any free motion between shaft and hub can be prevented.

The wedge also produces a large-surface abutment between steering wheel, wedge and hub portion, which provides an increased stability. Studs with a conical end, which have been used so far, cannot produce such stability.

The wedge preferably has a central bore in which an axial pin of the drive screw is rotatably accommodated, a safety means in the form of a separate part connecting the drive screw and the wedge in axial direction. Therefore, wedge and drive screw are different parts which can be made of different materials. The wedge does not rotate with the rotation of the drive screw.

The drive screw is radially directed towards the imaginary middle axis of the steering shaft, and preferably the resultant force exerted by the wedge on the steering shaft (graphically speaking the force vector) is radially directed towards the imaginary middle axis, too. Advancing the wedge does therefore not lead to a force component which might cause a peripheral rotation of the steering shaft relative to the hub portion.

Furthermore, the hub portion is preferably designed such that the wedge can axially be moved into the recess and via the recess can be placed against the guiding surface and subsequently be displaced radially. This possibility reduces the effort for manufacturing the hub portion, as mounting the wedge can be effected via the recess.

Not only mounting the wedge, but also connecting the wedge with the drive screw is effected via the recess. The steering wheel attachment is designed such that upon inserting the wedge the drive screw can be screwed into the threaded bore radially from the outside, and that via the axial recess in the hub portion the two parts are subsequently detachably connected with each other in a nondestructive way. This embodiment ensures that it is not necessary to provide extremely large, radially continuous guideways weakening the hub portion, which guideways provide for a radial insertion of the wedge from the outside through the entire hub portion. The guideway for the wedge has to be only so deep that the wedge can be retracted far enough, in order to allow a mounting and removal of the steering wheel from the steering shaft and to ensure that the two parts are fixed in the mounted condition.

In accordance with a preferred embodiment, the drive screw has a fine thread. Additionally or optionally, the drive screw or the threaded bore can be designed as self-locking screw connection. In accordance with the preferred embodiment, it is provided for this purpose that the drive screw has a threaded portion which has a nut in which a safety thread is inserted, which is deformed when the screw is screwed in and ensures the locking of the drive screw. With the design as fine thread and with the self-locking feature a high unscrewing moment and a high vibration resistance are obtained with very little effort. In addition, the self-locking feature is preferably realized such that a further assembly upon disassembly is possible without an exchange of parts.

In accordance with one aspect of the invention, a coding-for instance a projection engaging in a groove-is provided between the hub and the steering wheel. By means of this coding it is possible to mount the hub on the steering wheel in only one angular position.

In accordance with the preferred embodiment, the steering shaft has a conical surface at its free end, and to be more precise, the free end adjoins a conical surface at the steering shaft, which is formed relative to the wedge surface such that the hub portion is clamped between the wedge surface and the conical surface. The conical surface can thus be kept very large and in addition be used for centering hub portion and steering shaft.

DETAILED DESCRIPTION OF THE PREFERRED EMBODIMENTS

Figure 1:
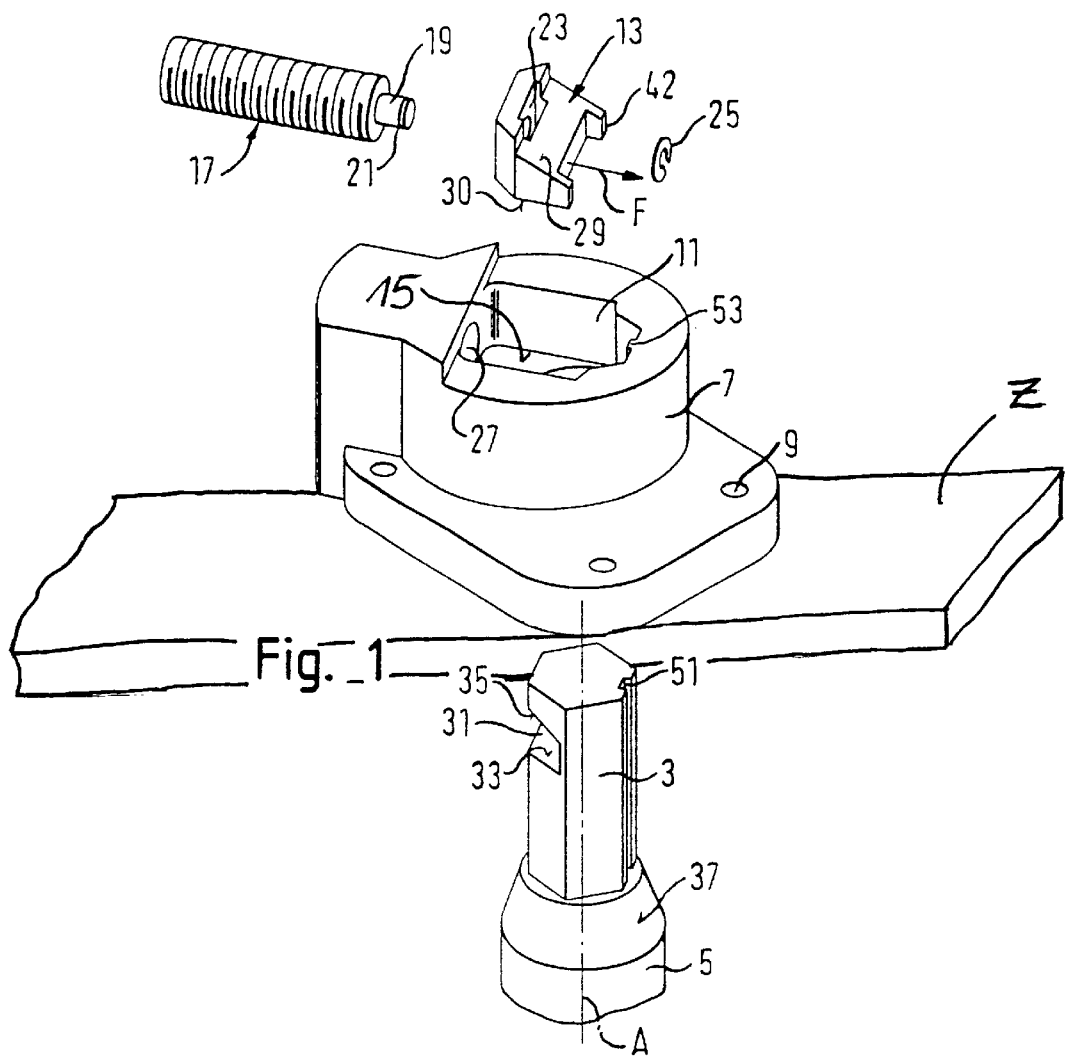
FIG. 1 shows an exploded view of a first embodiment of the vehicle steering wheel attachment according to the invention.
Figure 2:
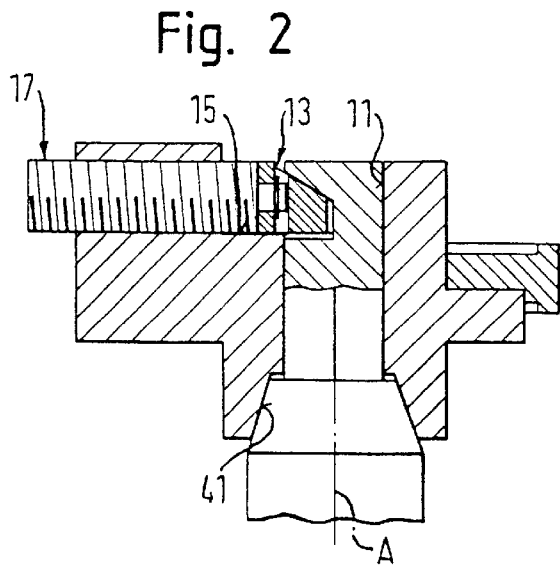
FIG. 2 shows a longitudinal section through the vehicle steering wheel attachment as shown in FIG. 1 in the mounted condition of the vehicle steering wheel.

In FIG. 1, a vehicle steering wheel attachment is represented, which has a free end 3 of a steering shaft 5, which is formed as multiple-cornered profile, more precisely as a hexagon profile. The vehicle steering wheel attachment furthermore has a hub portion 7 connected with the steering wheel skeleton via openings 9, wherein the hub portion can also be integrally connected with the steering wheel skeleton. In FIG. 1 there can also be seen a structural part Z of a steering wheel which is not shown in further detail here. The hub portion has a continuous multiple-cornered recess 11 corresponding to the polygonal cross-section of the hexagon profile. Via the recess 11, a wedge 13 can axially be inserted into the recess 11 from above. As can be seen in FIG. 2, the recess 11 verges into a radial guiding surface 15 against which the wedge abuts and along which it is radially movable. The wedge is connected with a drive screw 17. For this purpose, the drive screw 17 has an axially protruding pin 19 with an annular groove 21, the pin 19 being plugged into an opening in the wedge 13. An axial slot 23 in the wedge 13 intersects this opening, so that via the slot 23 a safety means in the form of a locking ring 25 can be mounted onto the pin 19. This attachment is effected after the wedge 13 has been inserted in the recess 11 and the drive screw 17 has been screwed into the corresponding threaded bore 27 in the hub portion 7. The wedge 13 has an upper, inclined wedge surface 29 and a lower surface 30 extending at right angles to the axis A and to the recess 11.

The free end 3 of the steering shaft 5 has a radial groove 31, which has a lower abutment surface 33 extending at right angles to the imaginary axis A of the steering shaft 5 and an upper, inclined wedge surface 35, whose angle A with respect to the axis A corresponds to the angle of the surface 29 with respect to the axis A.

The multiple-cornered profile at the free end verges into a conical surface 37, wherein, as can be seen in FIG. 2, the recess 11 verges into a lower, widened portion 41, which has an inclination corresponding to the inclination of the conical surface 37.

In the mounted condition, the drive screw 17 is exactly radially directed towards the imaginary middle axis A of the steering shaft just as the resultant force exerted by the wedge 13 on the steering shaft 5, which resultant force is characterized by the force vector F. For aligning the wedge with respect to the steering shaft 5, the wedge has lateral projections 42 laterally engaging at the steering shaft 5.

To ensure that the steering shaft is exactly aligned with respect to the hub portion 7 and there cannot occur an incorrect assembly with respect to the angular position of the hub portion 7, a coding is provided, which consists of an axial groove 51 at the steering shaft 5 and a corresponding projection 53 at the hub portion, which engages in the groove 51.

Upon mounting the hub portion with the wedge 13 retracted, the drive screw 17 is actuated, and the wedge 13 moves into the groove 31. The surfaces 35, 29 rest against each other and slide on each other, the drive screw 17 being screwed into the threaded bore 27 until the conical surfaces 37, 41 abut against each other. Thus, there is obtained a clamping between the surfaces 37 and 35, which leads to a clearance-free attachment of the hub portion 7 on the steering shaft 5.

Figure 3:
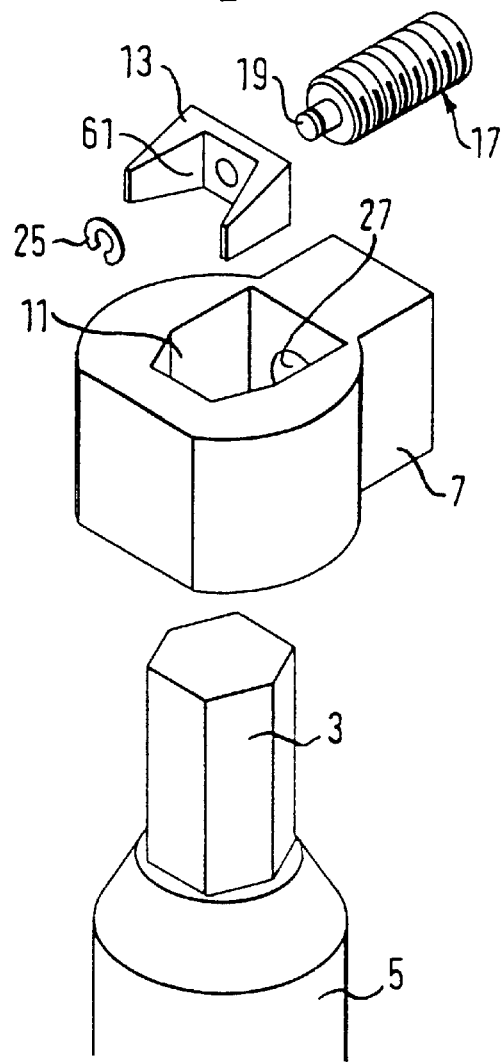
FIG. 3 shows an exploded view of another embodiment of the vehicle steering wheel attachment according to the invention.
Figure 4:
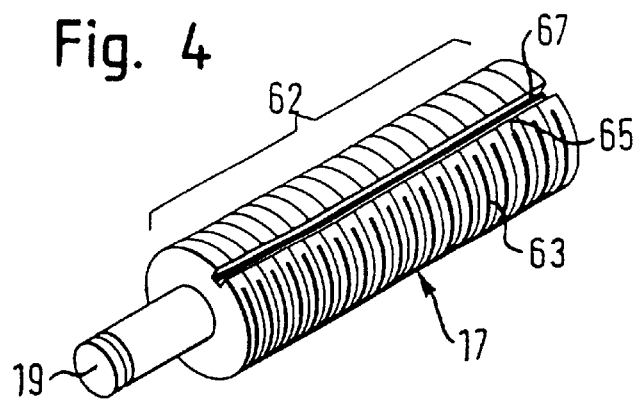
FIG. 4 shows an enlarged view of the drive screw shown in FIGS. 1 and 3.

In the embodiment represented in FIG. 3, the wedge 13 is provided with a deeper recess 61 in contrast to the embodiment represented in FIG. 1, whereas in FIG. 1 only a minimal recess is provided. In this embodiment, however, no slot 23 is necessary, as via the deep recess 61 the locking ring 25 can directly be clipped onto the pin 19.

To provide a kind of screw retention, which is effected in a simple way, the drive screw 17 has a fine thread 63 in the area of the threaded portion 62. As an additional safety means, in order to achieve a self-locking screw connection, an axial groove 65 has been milled in, into which an elastic safety thread 67 made of nylon has been inserted. The thread is elastically deformed when the drive screw 17 is screwed in and increases the torque. The locking thus obtained provides for a repeated assembly and disassembly of the steering wheel attachment. The fine thread promotes the locking of the connection.

What is claimed is:

1. A vehicle steering wheel attachment for detachably arresting a vehicle steering wheel on a vehicle steering shaft, said attachment comprising:
    a free end of an axially extending steering shaft which end has a multiple-cornered profile, said free end further having a radial groove including a wedge surface,
    a hub portion of said steering wheel, said hub portion including a multiple-cornered recess corresponding to said multiple-cornered profile of said steering shaft and a radial guiding surface, said radial guiding surface extending radially with respect to said axially extending steering shaft;
    a wedge moving radially along said radially extending guiding surface to move in and out of engagement with said groove,
    a drive screw having a longitudinal length defining two opposite axial directions, said drive screw being seated in a threaded bore in said hub portion and having a threadless outer surface portion which extends into said wedge to allow the drive screw to be rotated relative to said wedge, said drive screw and said wedge being coupled to each other for movement together in both opposite axial directions of said drive screw to move said wedge in and out of said groove.

2. The vehicle steering wheel attachment as claimed in claim 1, wherein said wedge has a central bore in which an axial pin of said drive screw is rotatably accommodated, a safety means being provided for connecting said drive screw and said wedge in an axial direction.

3. The vehicle steering wheel attachment as claimed in claim 1, wherein said wedge and said drive screw are detachably connected with each other in a nondestructive way.

4. The vehicle steering wheel attachment as claimed in claim 1, wherein said steering wheel has an imaginary middle axis, said drive screw being provided so as to be radially directed to said steering shaft.

5. The vehicle steering wheel attachment as claimed in claim 1, wherein said steering wheel has an imaginary middle axis, and wherein said wedge is aligned with respect to said steering shaft such that a resultant force exerted by said wedge on said steering shaft is directed radially towards said imaginary middle axis of said steering shaft.

6. The vehicle steering wheel attachment as claimed in claim 1, wherein said hub portion is designed such that via said recess said wedge can axially be placed against said guiding surface and subsequently be radially moved on the latter.

7. The vehicle steering wheel attachment as claimed in claim 6, wherein said hub portion is designed such that after insertion of said wedge said drive screw can be screwed into said threaded bore radially from outside, and said hub portion and said drive screw can subsequently be detachably connected with each other.

8. The vehicle steering wheel attachment as claimed in claim 1, wherein between said hub portion and said steering shaft a coding is provided, which coding allows mounting said hub portion onto said steering shaft in only one angular position.

9. The vehicle steering wheel attachment as claimed in claim 1, wherein adjoining said free end a conical surface is provided on said steering shaft, said conical surface being designed relative to said wedge surface such that said hub portion is clamped between said wedge surface and said conical surface.

10. The vehicle steering wheel attachment as claimed in claim 1, wherein said drive screw has a fine thread.

11. The vehicle steering wheel attachment as claimed in claim 1, wherein said drive screw and said threaded bore are designed as a self-locking screw connection.

12. The vehicle steering wheel attachment as claimed in claim 11, wherein said drive screw has a threaded portion with a groove in which a safety thread has been inserted.

13. A vehicle steering wheel attachment tar detachably arresting a vehicle steering wheel on a vehicle steering shaft, said attachment comprising:

a free end of an axially extending steering shaft which end has a multiple-cornered profile, said free end further having a radial groove including a wedge surface, and a hub portion of said steering wheel, said hub portion including a multiple-cornered recess corresponding to said multiple-cornered profile of said steering shaft and a radial guiding surface, the radial guiding surface extending radially with respect to said axially extending steering shaft, a wedge moving radially along said radial guiding surface to move in and out of engagement with said groove, a drive screw seated in a threaded bore in said hub portion and rotatably coupled with said wedge, said drive screw having an axial pin portion with a threadless outer surface portion, said wedge having a central bore in which said threadless outer surface portion is rotatably accommodated, and a separate safety means for coupling said drive screw and said wedge for movement together in both opposite axial directions of said drive screw, said safety means being attached to a free axial end of said pin portion.

14. A vehicle steering wheel attachment for detachably arresting a vehicle steering wheel on a vehicle steering shaft, said attachment comprising:

a free end of an axially extending steering shaft which end has a multiple-cornered profile, said free end further having a radial groove including a wedge surface, and a hub portion of said steering wheel, said hub portion including a multiple-cornered recess corresponding to said multiple-cornered profile of said steering shaft and a radial guiding surface, said radial guiding surface extending radially with respect to said axially extending steering shaft, a wedge moving radially along said radial guiding surface to move in and out of engagement with said groove, and a drive screw seated in a threaded bore in said hub portion and rotatably coupled with said wedge, said wedge having a U-shape with lateral projections laterally engaging said steering shaft.

* * * * *

UNITED STATES PATENT AND TRADEMARK OFFICE
CERTIFICATE OF CORRECTION

PATENT NO. : 6,561,060 B2
DATED : May 13, 2003
INVENTOR(S) : Anke Nigrin

It is certified that error appears in the above-identified patent and that said Letters Patent is hereby corrected as shown below:

Column 5,
Line 13, after "attachment" change "tar" to -- for --.

Signed and Sealed this

Fourth Day of May, 2004

JON W. DUDAS
*Acting Director of the United States Patent and Trademark Office*